I. WANTLING.
SIFTING MECHANISM.
APPLICATION FILED MAY 2, 1910.
1,002,343.
Patented Sept. 5, 1911.
2 SHEETS—SHEET 1.
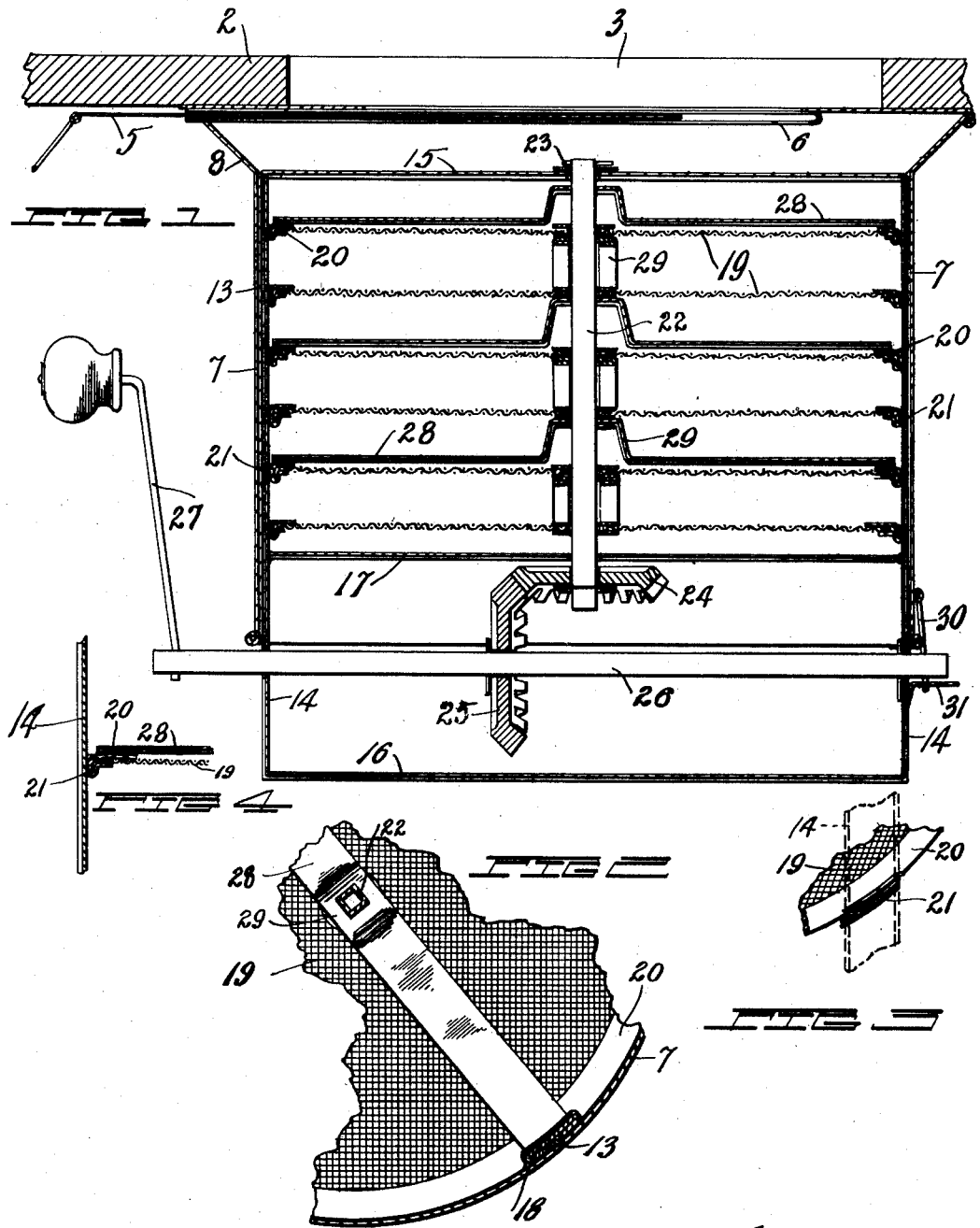
Witnesses
Robert Plowe
C. M. Genthner
Inventor
Isaac Wantling
By Chas. H. LaPorte
Atty

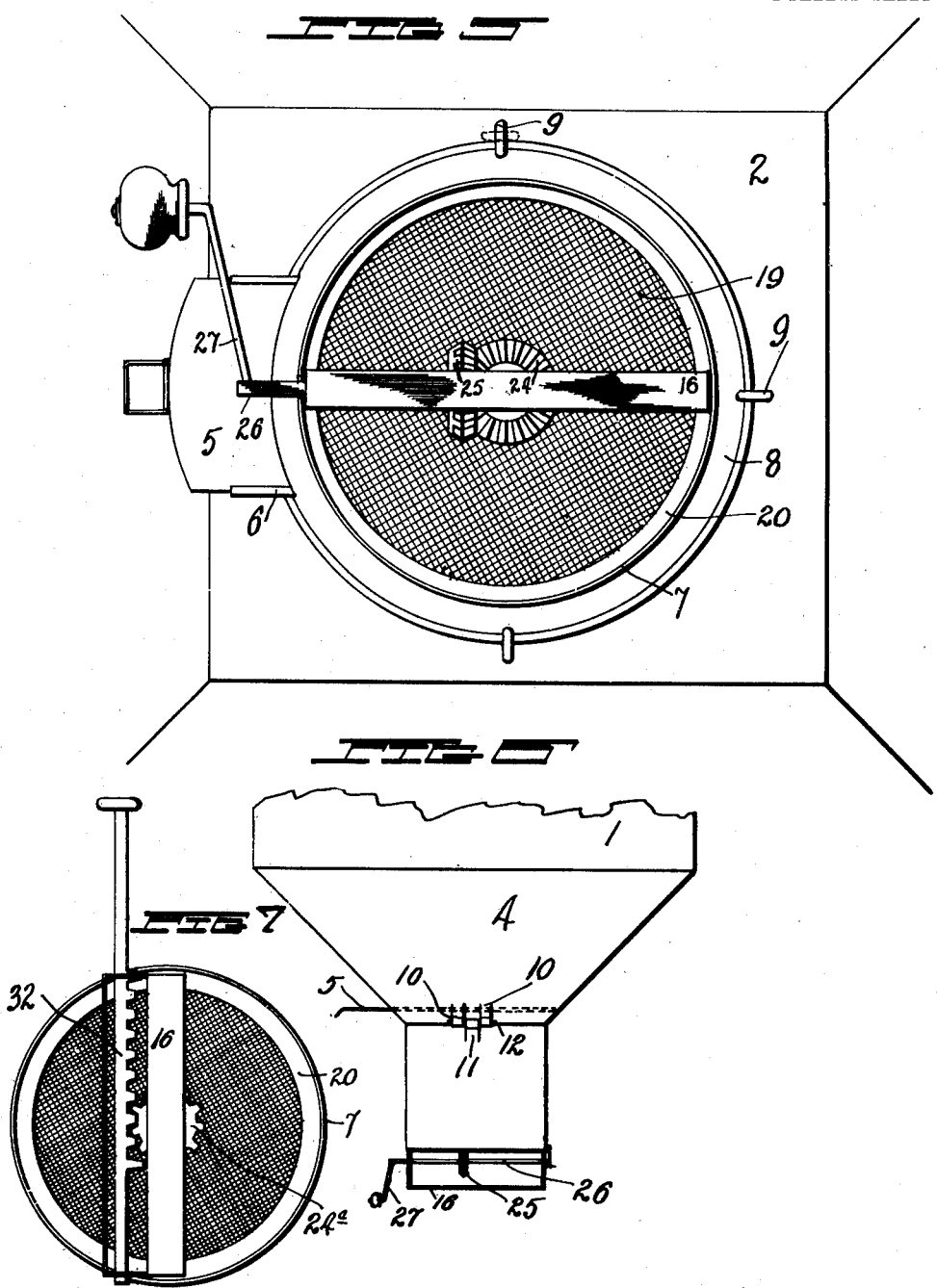

UNITED STATES PATENT OFFICE.

ISAAC WANTLING, OF PEORIA, ILLINOIS.

SIFTING MECHANISM.

1,002,343. Specification of Letters Patent. Patented Sept. 5, 1911.

Application filed May 2, 1910. Serial No. 558,917.

*To all whom it may concern:*

Be it known that I, ISAAC WANTLING, a citizen of the United States, residing at Peoria, in the county of Peoria and State of Illinois, have invented certain new and useful Improvements in Sifting Mechanism, of which the following is a specification.

This invention has reference to sifters and relates to that class of sifters which are used for sifting flour or like materials and designed for use in connection with flour bins built in kitchen cabinets and those bins which are not, while at the same time the sifter may be detached from the bin if desired and used separate and apart from the bin.

One of the objects of the present invention is to provide a sifter for bins, especially those in kitchen cabinets which shall be provided with a plurality of removable sieves or screens, whereby the sifting of the flour as it is taken from the bin may be as fine as desirable, without the necessity of resifting the flour, which is now the case; and to provide suitable gearing and operating means for the sifter, which makes it possible to employ a plurality of sieves or screens, preferably carried one above the other.

A further object of the invention is to so construct and provide for the attachment of the sifter to the bin that it may be removed, either for the purpose of changing or removing the sieves or screens or for using the sifter apart from the bin, a cut-off being provided for retaining the material in the bin when the sifter is removed, which said cut-off may be used for regulating the flow of material to the sifter.

Other and various objects of the invention will more fully appear from the following description.

In the drawings, accompanying the description:—Figure 1 is a vertical section through the sifter, the view also disclosing the lower end of a bin or hopper to which the sifter is attached; Fig. 2 is a partial plan view and section, showing certain features of construction; Fig. 3 is a detail perspective showing how the sieves or screens are depressed or bent to produce a locking relation between the sieves or screens and supporting frame; Fig. 4 is a cross-section through one of the depressed or bent portions of the sieves or screens, shown in Fig. 3, also showing the supporting frame; Fig. 5 is a bottom plan view of Fig. 1, but on a smaller scale; Fig. 6 is a side elevation, on a greatly reduced scale, showing the application of the invention to a flour bin, such as is used in certain kitchen cabinets; Fig. 7 is an end view of the sifter showing a modification in the manner of operating the sieve shaft.

Like numerals indicate corresponding parts throughout the figures.

In the drawings, 1 designates a hopper. In Fig. 1 the hopper has a flat wood bottom 2 with an opening 3 and in Fig. 5 the entire hopper is made of metal with a tapered lower end, as at 4.

5 is a slide valve for closing the opening 3 in Fig. 1 and the lower discharge end in Fig. 5, and said slide is movable in the guide-way 6.

7 designates the casing of the sifter, which, when employed as shown in Figs. 1 and 5 has the flared or cone-shaped end 8 against which, locking means such as the thumb-nuts 9 bear against for detachably securing the sifter and casing to the bin or hopper. In Fig. 6 the flared or cone-shaped end of the casing 7 is omitted and the securing means for connecting the casing 7 to the hopper comprises ears 10 from the bin and an ear 11 from the casing connected by a pin 12. The casing 7 is preferably cylindrical in shape and open at both ends and when formed with a uniting seam or rib 13, as shown in Fig. 2, said rib serves to prevent a frame to be inserted into the casing, from rotating in the casing. The frame referred to, is the sieve or screen supporting frame and is composed of the parallel side frames 14 and connecting end frames 15 and 16, and the intermediate cross-frame 17. The side frames 14, in cross section, appear as shown in Fig. 2 with a longitudinal groove 18 in which fits the seam or rib 13 of the casing, when the frame is inserted into the casing, and the rotation of the frame is thereby prevented. The frame, composed of the side frames 14, ends 15 and 16 and the intermediate cross-frame 17 is adapted to have a detachable relation with the casing 7, and supports or carries the sieves or screens. These sieves comprise a plurality of, preferably circular foraminated sheets 19 having a border or outer ring 20 of metal and said rings at diametrically opposite points are stamped or depressed, as at 21, see Figs. 3 and 4 producing a cut-out portion to receive the side frames 14 when the sieves are inserted in place and holds said sieves from rotating. It is preferable to use a plurality of the sieves 19, or one or more may be used, as desired. Said sieves are carried on a shaft 22 having a bearing in the end cross-frame 15 and the cross-brace 17, being held in place by the pin 23, and the bevel gear 24 on the inner end of the shaft. Meshing with the gear 24 is a bevel gear 25 carried on a cross-shaft 26, having a bearing in the side frames 14. By removing the shaft 22 the sieves 19 may also be removed, allowing the operator to add to or reduce the number of sieves in the frame. The shaft 26 has attached thereto a crank 27 by means of which the shaft 26 may be operated to impart rotation to the shaft 22.

It is not intended to operate the sieves 19, they being held loosely on the shaft 22, but said shaft operates the agitators, stirrers or scrapers 28. These agitators, stirrers or scrapers have the central bent or arched portions 29 which are so constructed for the purpose of suitably spacing and holding the sieves spaced on the shaft 22. The function of the agitators, stirrers or scrapers is to separate the material allowing air to commingle therewith which lightens as well as bleaches the material. When the sieves and sieve supporting frame are inserted into operative position in the casing 7 the same are locked in such position by a bail 30 which is adapted to engage a plate 31 attached to one of the side frames 14, see Fig. 1. Releasing the bail from said plate permits of the removal of the frame and sieves from the casing.

In Fig. 8, for the gear 25, shaft 26 and crank 27 I have substituted a rack 32 which is in mesh with a spur gear 24ª on the sieve shaft 22. In this instance the operating means, the rack, is reciprocated instead of being rotated, as by the crank 27 and the rack is long enough to insure a complete rotation of the shaft 22, when said rack is operated.

It is obvious from the foregoing that with the use of my sifter, flour and like material may be sifted as many times as it is desired to sift the same, without the necessity of providing and employing additional sieves, as is now the case with kitchen cabinets in use; also, that the sieve supporting frame may be removed when the occasion demands for changing or cleaning the sieves; also, that the sifter may be entirely detached from the bin and used separate and apart from the bin, the cut off making it possible to shut off the delivery end of the bin, to allow for the removal of said sifter.

What I claim is:—

1. In a device of the character described, in combination, a sifter casing, a frame removably carried in said casing, a plurality of sieves carried by said frame, each sieve having a selvage ring with diametrically opposed recessed edge adapted to have a locking relation with said frame, a stirrer between each sieve, and means for operating the stirrers in unison.

2. In a device of the character described, in combination, a cylindrical casing having a longitudinal rib, a frame having parallel sides grooved to receive the rib of the casing, a shaft having a bearing in said frame, a plurality of sieves non-rotatably carried on said shaft, a stirrer between said sieves and rotatably connected with said shaft, and means for operating said shaft.

3. In a device of the character described in combination, a sifter casing, a frame removably carried in said casing, a sieve carried by said frame, said sieve having diametrically opposed recesses in the edge thereof adapted to have locking relation with said frame, a stirrer and means to operate said stirrer.

4. In a device of the character described, in combination, a casing, a frame removably carried in said casing, a plurality of sieves carried by said frame, a shaft passing through said sieves, stirrers carried by said shaft adjacent each sieve and having central arched portions to space the sieves apart and means for operating said shaft.

5. In a device of the character described, in combination, a rectangular frame removably supported in the said casing, a plurality of super-imposed sieves non-rotatably carried in said frame, a square shaft passing through said sieves, stirrers carried by said shaft adjacent each sieve and having central arched portions to space the sieves apart and means for operating said shaft.

6. In a device of the character described, in combination, a cylindrical casing having a longitudinal rib, a rectangular frame having its parallel sides grooved to receive the rib of the casing, said frame being removably supported in said casing, a plurality of sieves carried in said frame, a square shaft passing through said sieves and having a bearing in said frame, stirrers carried by said shaft adjacent each sieve having central arched portions to space and support the sieves apart and means for operating said shaft.

In testimony whereof I affix my signature, in presence of two witnesses.

ISAAC WANTLING.

Witnesses:
CHAS. W. LA PORTE,
ROBERT PLOWE.